United States Patent [19]

Ehlers et al.

[11] 4,134,962

[45] Jan. 16, 1979

[54] PRODUCTION OF PURE ALKALI METAL PHOSPHATE SOLUTIONS FROM WET-PROCESSED PHOSPHORIC ACIDS

[75] Inventors: Klaus-Peter Ehlers, Erftstadt-Lechenich; Gero Heymer, Erftstadt-Liblar, both of Fed. Rep. of Germany

[73] Assignee: Hoechst Aktiengesellschaft, Frankfurt am Main, Fed. Rep. of Germany

[21] Appl. No.: 771,167

[22] Filed: Feb. 23, 1977

[30] Foreign Application Priority Data

Feb. 27, 1976 [DE] Fed. Rep. of Germany ....... 2608029

[51] Int. Cl.$^2$ ..................... C01B 15/16; C01B 25/26; C01B 25/16
[52] U.S. Cl. ................................. 423/313; 423/309; 423/321 R
[58] Field of Search ............... 423/309, 313, 307, 308, 423/311, 312, 321 R

[56] References Cited

U.S. PATENT DOCUMENTS

| | | | |
|---|---|---|---|
| 2,174,138 | 9/1939 | Kepfer et al. | 423/309 |
| 3,305,305 | 2/1967 | Peterson et al. | 423/313 |
| 3,421,845 | 1/1969 | Peterson | 423/309 |
| 3,493,336 | 2/1970 | Milling | 423/313 |

FOREIGN PATENT DOCUMENTS 1268124 3/1972 United Kingdom ..................... 423/309

*Primary Examiner*—O. R. Vertiz
*Assistant Examiner*—Gregory A. Heller
*Attorney, Agent, or Firm*—Connolly and Hutz

[57] ABSTRACT

Alkali metal phosphate solutions (alkali metal oxide : $P_2O_5$ - molar ratio greater than 1.9 : 1) of reduced vanadium and chromium contents are made from wet-processed phosphoric acids which are neutralized by means of an alkali metal hydroxide and/or carbonate. The alkali metal phosphate solutions contain less than 20 ppm of vanadium and less than 1 ppm of chromium and are made by stepwise neutralization. More specifically the acid is neutralized in a first step to an alkali metal oxide to $P_2O_5$ - molar ratio of 1.0 : 1 to 1.8 : 1; resulting precipitate is separated and resulting solution is admixed with iron(II)salt at 60 to 90° C. Next, the acid is neutralized in a second step to an alkali metal oxide to $P_2O_5$ - molar ratio greater than 1.9 : 1, and resulting precipitate is separated again.

5 Claims, No Drawings

PRODUCTION OF PURE ALKALI METAL PHOSPHATE SOLUTIONS FROM WET-PROCESSED PHOSPHORIC ACIDS

The present invention relates to a process for making alkali metal phosphate solutions presenting an alkali metal oxide to $P_2O_5$ - molar ratio greater than 1.9:1 and a reduced content of vanadium and chromium, from wet-processed phosphoric acid contaminated with chrominum and vanadium, wherein the phosphoric acid is neutralized by means of an alkali metal hydroxide and/or carbonate, admixed at elevated temperature with an iron(II)salt to reduce the vanadium, and the resulting precipitate is separated.

One of the most important commercial uses of alkali metal phosphate solutions is in making condensed alkali metal phosphates, primarily di- and triphosphates, the latter being important constituents of substantially all current detergent compositions. Alkali metal phosphate solutions, which are made from thermally-processed phosphoric acid, are usually very pure and give very pure salts. Considerable difficulties are, however, encountered in the preparation of products of similar purity from wet-processed phosphoric acids containing contaminants which cannot or can only insufficiently be removed by neutralization. This is more particularly true concerning heavy metal contaminants, e.g. vanadium and chromium, of which even traces are sufficient to cause undesirable coloration of the final products, of which the quality is naturally impaired.

The removal of these two metal contaminants from wet-processed phosphoric acid is more specifically a troublesome process in those cases in which the crude phosphoric acid contains increased proportions of the above contaminants.

A process for decontaminating phosphate solutions which in fact contain vanadium but are free from chromium has already been described in U.S. Pat. No. 3,305,305, wherein an alkali metal phosphate solution is treated with an alkali metal hydroxide or carbonate solution so as to establish a pH-value of 8.0 to 9.0, and then admixed with a solution containing ferro-ions, preferably in the form of ferrosulfate, at a temperature between 80° C. and the boiling point of the solution, the solution being used in the quantity necessary to convert vanadium to an iron-vanadium-phosphorus complex compound.

A disadvantage encountered with this process resides in the fact that the ferro-ions are added at an alkali metal oxide to $P_2O_5$ - molar ratio greater than 1.8:1, i.e. within a stability range within which bivalent iron is considerably less active than desirable, relative to the vanadium present in the solution. As a result, it is necessary in the process just described to use relatively large proportions of iron sulfate. This, however, is associated with heavy loss of $P_2O_5$ and with the formation of triphosphates which, despite the use of large quantities of iron sulfate, fail to meet the high purity demands, e.g. of the detergent industry.

A further process for decontaminating wet-processed phosphoric acid contaminated with 90 to 140 ppm of vanadium and about 70 ppm of chromium has been described in U.S. Pat. No. 3,421,845, wherein the acid is admixed at a temperature of 25 to 100° C. with a reductant, e.g. a sulfite, nitrite, phosphite, sulfide, hydrazine or metallic iron, then treated with a sodium hydroxide solution to establish a Na:P - molar ratio of 1.9–2.2, and the resulting precipitate is separated.

All of theses processes are, however, not fully satisfactory relative to the removal of vanadium, especially in those cases in which the phosphoric acid solution contains relatively large proportions of undesirable trace elements, especially chromium. Table I hereinafter is intended to inter alia demonstrate the influence of the chromium content on the removal of vanadium from crude phosphoric acids which contain identical proportions of ferro-ions but different proportions of the chromium contaminant, and which are subjected to single stage neutralization by means of an alkaline liquor so as to obtain disodium phosphate.

The results indicated in the Table were obtained in test runs made on commercial quantities of material, which was subjected to continuous precipitation. The continuous precipitation method, wherein metered quantities of acid and alkaline liquor are introduced in parallel into a suspension neutralized to the desired alkali metal oxide to $P_2O_5$ - molar ratio and placed in a receiver, compares very favorably with all other precipitation methods in respect of the following points: It produces precipitate with optimum filtration properties and it permits the capacity of commercial plants to be effectively utilized. It has, however, been found that the removal of vanadium is rendered additionally difficult by the precipitation just described. The reason for this resides in the fact that the acid is neutralized discontinuously, i.e. admixed with the quantity of alkali necessary to establish a desirable alkali metal dioxide to $P_2O_5$ - molar ratio, and that the coprecipitation effects which are associated with such discontinuous neutralization are considerably reduced by other compounds.

It is therefore an object of the present invention to provide a process permitting wet-processed phosphoric acid containing important proportions of vanadium and chromium to be effectively decontaminated by neutralization.

The process of the present invention for making alkali metal phosphate solutions containing less than 20 ppm of vanadium and less than 1 ppm of chromium, based on $P_2O_5$ comprises more specifically: subjecting wet-processed phosphoric acid containing more than 400 ppm, preferably 800 to 1200 ppm, of vanadium, and more than 600 ppm, preferably 1000 to 1500 ppm, of chromium to stepwise neutralization by initially neutralizing the acid in a first step so as to establish an alkali metal oxide to $P_2O_5$ - molar ratio of 1.0:1 to 1.8:1; separating the resulting precipitate and admixing the resulting solution with an iron(II)salt at temperatures of 60 to 90° C.; further neutralizing the acid in a second step so as to establish an alkali metal oxide to $P_2O_5$ - molar ratio greater than 1.9:1, and separating again the resulting precipitate.

The principal advantage which is associated with the present process resides in the fact that by neutralizing the crude acid until establishment of an alkali metal oxide to $P_2O_5$ - molar ratio of 1.0 to 1.8:1, it is possible to effect the advance precipitation of the bulk of the chromium contaminant which adversely affects the separation of vanadium. After separation of the precipitate, the ferro-ions which are added in the form of a salt effectively act on the vanadium retained in the solution and convert it to a stable phosphate complex.

TABLE I

| | Crude acid | | | | Neutralized matter | | |
|---|---|---|---|---|---|---|---|
| Test run | V ppm/$P_2O_5$ | Cr ppm/$P_2O_5$ | $Fe^{++}$ % $P_2O_5$ | % $P_2O_5$ | $Na_2O:P_2O_5$ molar ratio | V ppm/$P_2O_5$ | Cr ppm/$P_2O_5$ |
| 1 | 450 | 4 | 0.56 | 19.5 | 2.02 : 1 | 40 | 1 |
| 2 | 480 | 700 | 0.56 | 19.2 | 2.0 : 1 | 78 | 33 |
| 3 | 850 | 1200 | 1.00 | 19.25 | 2.01 : 1 | 132 | 42 |

It is a further advantage of the present process that it can be used in combination with one of the processes described heretofore for the decontamination of crude phosphoric acid. Thus, for example, by admixing the phosphoric acid with a suitable reductant, e.g. hydrogen sulfide, sodium dithionite or formaldehyde sodium sulfoxylate, it is possible to convert iron which may be contained in the crude acid to the second oxidation stage, and in this manner to effect as early as in the first neutralization step the coprecipitation of chromium and significant proportions of vanadium, which are separated from the solution together with precipitated neutralized matter. It is a further advantage of the present process that it can be carried out with the use of relatively small quantities of iron(II) salts, based on the vanadium contained in the crude acid (at most 6 mols of $FeSO_4$ per mol of V). This has highly desirable effects on the $P_2O_5$ content of the neutralized sludge, which is lost, and on the economy of the whole process.

The preferred ferro-salts include those which are readily soluble in aqueous solution, e.g. iron sulfate, iron nitrate or iron acetate. They may be used in solid form or in the form of an aqueous solution, preferably however in the form of an aqueous solution which is easier to handle and which becomes more rapidly effective in the solution. The quantity of iron(II)ions to be added depends on the degree of contamination of the acid, and also on the iron(II) level in the crude acid which is to undergo neutralization. The iron(II)ions should at least be used in the quantity necessary to convert the vanadium in the acid to an iron vanadylphosphato-complex compound. In the case of crude acids which contain important proportions of vanadium and chromium (about 1000 ppm of V and 1500 ppm of Cr, based on $P_2O_5$, and natural iron(II) (0.05% based on $P_2O_5$), unaffected by prior reductive treatment, it is generally sufficient for the neutralized acid to be admixed with iron in the bivalent oxidation stage at a rate of 0.6 kg per 100 kg of $P_2O_5$, so as to obtain alkali metal phosphate solutions containing less than 20 ppm of vanadium and less than 1 ppm of chromium, based on $P_2O_5$. In the case of crude acids which contain the same proportions of contaminants and about 0.3% of iron(II), based on $P_2O_5$, but which were subjected to reducing treatment, it is sufficient, after neutralization and separation of the neutralized sludge, for the iron to be used at a rate of 0.3 kg per 100 kg of $P_2O_5$, to produce the same decontamination effects.

The neutralized solution should conveniently be kept at elevated temperature, preferably at a temperature of 60 to 90° C., while the iron(II) salt is added thereto, in order to facilitate precipitation of the iron vanadylphosphate-compound.

The targeted degree of neutralization should be equal to an alkali metal oxide to $P_2O_5$-molar ratio of 1.0:1 to 1.8:1. The higher the ratio within the range indicated, the more complete is the removal of chromium and vanadium during that operation. It has been found particularly advantageous to effect the neutralization in the vicinity of the neutral point, i.e. at a molar ratio of about 1.66:1.

The following Examples further illustrate the invention.

EXAMPLE 1

Two tests were run on crude phosphoric acid which was contaminated with 800 ppm of vanadium and 1000 ppm of chromium, based on $P_2O_5$. In one of these tests, untreated acid was used. In the other test, the acid was pretreated with 6.5 kg/h of formaldehyde sodium sulfoxylate and then subjected to the decontamination process of the present invention.

The decontamination was more specifically carried out as follows:

536 l/h of the above crude acid, which contained 31.2% of $P_2O_5$, and 267 l/h of a 50% sodium hydroxide solution were continuously introduced in parallel and with agitation into a neutralized sludge of the two components in a receiver. At the same time about 650 l/h of suspension was taken after a mean sojourn time of 30 minutes from the neutralization vessel, and filtered. This gave about 623 l/h of a sodium phosphate solution containing 66.6% of disodium phosphate.

The solution was admixed in the first test run with 17 kg/h and in the second test run with 8.5 kg/h of a 20% $FeSO_4$-solution and the whole was treated with 47 l/h of a 50% sodium hydroxide solution in the manner described above in connecton with the neutralization.

Suspension which was removed from the neutralization vessel was filtered. This gave 636 l/h of a disodium phosphate solution. The most relevant experimental data are indicated in Table II hereinafter. As can be seen, after neutralization to a $Na_2O:P_2O_5$-molar ratio of 1.66:1, the acid contained considerably less chromium.

In the test made on reductively pre-treated acid, the reduction of the chromium content was associated with a strong reduction of the vanadium content, which however did not reach the necessary minimum of 20 ppm, based on $P_2O_5$. In the two test runs, it was necessary, after neutralization and separation of the neutralized sludge, to add ferrosulfate, to increase the alkalinity up to a $Na_2O:P_2P_5$-molar ratio greater than 1.9:1, and to separate again the resulting precipitate so as to obtain a solution of desirable greater purity.

EXAMPLE 2

This example describes the decontamination in accordance with this invention of crude phosphoric acid heavily contaminated with vanadium and chromium. The first test was made on untreated acid while the second and third tests were run on acid pretreated with hydrogen sulfide and additionally with $Fe^{++}$-ions so as to establish a $Fe^{++}$-content of 0.62 and 1.0%, based on $P_2O_5$.

577 l/h of crude acid containing 35% of $P_2O_5$ and the proportions of vanadium and chromium indicated in the following Table III was neutralized in the manner described in Example 1 with 250 l/h of a 50% sodium hydroxide solution so as to establish a $Na_2O:P_2O_5$- molar ratio of 1.25:1. The suspension was filtered and 700 l/h of a sodium phosphate solution containing 26% of $P_2O_5$ was obtained. In the first test run, the solution was admixed with 17 kg/h, and in the second and third test runs it was admixed with 8.5 kg/h of a $FeSO_4$-solution. The solution so pretreated was further treated continuously with 133 l/h of a 50% sodium hydroxide solution to establish a $Na_2O:P_2O_5$-molar ratio of 1.98:1, and filtered once again. This gave 813 l/h of a decontaminated solution which contained 19.7 and 20.6% of $P_2O_5$, respectively.

Table III indicates the varying proportions of vanadium and chromium determined in the two steps. Test runs 2 and 3 made on crude acid with a high initial content of iron(II)ions demonstrate clearly that it is highly desirable to effect the iron(II) treatment in accordance with this invention, in the second step.

Table II
(Example 1)

| | Crude acid | | | Neutralized matter | | |
|---|---|---|---|---|---|---|
| Test run | V ppm/ $P_2O_5$ | Cr ppm/ $P_2O_5$ | $Fe^{++}$ %$P_2O_5$ | $Na_2O:P_2O_5$ molar ratio | Cr ppm/ $P_2O_5$ | V ppm/ $P_2O_5$ |
| 1 | 800 | 1000 | 0.055 | 1.66:1 | 71 | 300 |
| 2 | 480 | 700 | 0.32 | 1.66:1 | 34 | 64 |

| Iron(II)salt | | | $Na_2HPO_4$ - solution | | |
|---|---|---|---|---|---|
| Kind | Quantity $Fe^{++}$ %$P_2O_5$ | %$P_2O_5$ | $NaO:P_2O_5$ molar ratio | V ppm/ $P_2O_5$ | Cr ppm/ $P_2O_5$ |
| $FeSO_4 \cdot 7H_2O$ | 0.6 | 20.3 | 2.01:1 | 19.7 | 5 |
| $FeSO_4 \cdot 7H_2O$ | 0.3 | 21.1 | 1.98:1 | 9.4 | <1 |

Table III
(Example 2)

| | Crude acid | | | Neutralized matter | | |
|---|---|---|---|---|---|---|
| Test run | V ppm/ $P_2O_5$ | Cr ppm/ $P_2O_5$ | $Fe^{++}$ %$P_2O_5$ | $Na_2O:P_2O_5$ molar ratio | Cr ppm/ $P_2O_5$ | V ppm/ $P_2O_5$ |
| 1 | 1040 | 1220 | 0.06 | 1.25:1 | 142 | 352 |
| 2 | 1040 | 1220 | 0.62 | 1.25:1 | 121 | 148 |
| 3 | 1040 | 1220 | 1.00 | 1.25:1 | 95 | 110 |

Table III-continued
(Example 2)

| Iron(II)salt | | $Na_2HPO_4$ - solution | | |
|---|---|---|---|---|
| Kind | $Fe^{++}$ %$P_2O_5$ | %$P_2O_5$ | $NaO:P_2O_5$ molar ratio | V ppm/ $P_2O_5$ | Cr ppm/ $P_2O_5$ |
| $FeSO_4 \cdot 7H_2O$ | 0.6 | 19.7 | 1.98:1 | 18.5 | 7.6 |
| $FeSO_4 \cdot 7H_2O$ | 0.3 | 20.6 | 1.99:1 | 12 | 1 |
| $FeSO_4 \cdot 7H_2O$ | 0.3 | 21.3 | 2.01:1 | 9 | 1 |

We claim:

1. A process of preparing, from wet-processed phosphoric acid containing more than 400 ppm vanadium and more than 600 ppm chromium, alkali metal phosphate solutions containing less than 20 ppm vanadium and less than 1 ppm chromium based on $P_2O_5$ and having an alkali metal oxide to $P_2O_5$ ratio greater than 1.9:1, which comprises
   (a) neutralizing the acid to an alkali metal oxide to $P_2O_5$ molar ratio of 1.0:1 to 1.8:1,
   (b) separating the resulting precipitate,
   (c) admixing the resulting solution with iron(II) salt at 60 to 90° C.,
   (d) further neutralizing the acid to an alkali metal oxide to $P_2O_5$ molar ratio greater than 1.9:1, and
   (e) separating the precipitate resulting in (d).

2. The process as claimed in claim 1, wherein the wet-processed phosphoric acids contain 800 to 1200 ppm of vanadium and 1000 to 1500 ppm of chromium.

3. The process as claimed in claim 1, wherein an alkali metal oxide to $P_2O_5$-molar ratio of about 1.66:1 is established in the first neutralization step.

4. The process as claimed in claim 1, wherein the starting wet-processed phosphoric acid contains about 1000 ppm of vanadium, about 1500 ppm of chromium and 0.05% of iron(II), based on $P_2O_5$, and the alkali metal phosphate solution obtained after the first neutralization step is admixed, per 100 kg of $P_2O_5$, with a quantity of the iron(II) salt corresponding to about 0.6 kg of iron.

5. The process as claimed in claim 1, wherein the starting wet-processed phosphoric acid contains about 1000 ppm of vanadium, about 1500 ppm of chromium and about 0.3% of iron(II), based on $P_2O_5$, and the alkali metal phosphate solution obtained after the first neutralization step is admixed, per 100 kg of $P_2O_5$, with a quantity of the iron(II)salt corresponding to about 0.3 kg of iron.

* * * * *